United States Patent [19]
Walsh

[11] Patent Number: 5,825,516
[45] Date of Patent: Oct. 20, 1998

[54] OPTICAL POWER METER FOR DETECTING LOSS FACTORS IN FIBER OPTIC COMMUNICATIONS

[75] Inventor: Peter J. Walsh, Colorado Springs, Colo.

[73] Assignee: Hewlett-Packard Company, Palo Alto, Calif.

[21] Appl. No.: 686,289

[22] Filed: Jul. 25, 1996

[51] Int. Cl.[6] .......................... H04B 10/12; H04B 10/06
[52] U.S. Cl. .................... 359/112; 359/155; 359/173; 356/73.1
[58] Field of Search .................... 359/110, 112, 359/155, 161, 173, 177, 194, 195; 250/227.15, 227.16; 356/73.1

[56] References Cited

U.S. PATENT DOCUMENTS

| | | | |
|---|---|---|---|
| 4,178,101 | 12/1979 | Booth ....................................... | 356/221 |
| 4,435,850 | 3/1984 | Bowen et al. ........................... | 359/152 |
| 4,578,671 | 3/1986 | Flowers .................................... | 340/636 |
| 4,636,029 | 1/1987 | Johansson et al. ..................... | 359/110 |
| 5,237,441 | 8/1993 | Nhu .......................................... | 359/152 |
| 5,258,615 | 11/1993 | Thorley .................................... | 359/192 |
| 5,485,296 | 1/1996 | Healey et al. ........................... | 359/112 |
| 5,535,038 | 7/1996 | Hinch ....................................... | 359/110 |
| 5,557,265 | 9/1996 | Moothart et al. ....................... | 359/110 |
| 5,570,217 | 10/1996 | Fleuren .................................... | 359/110 |
| 5,596,440 | 1/1997 | Patz et al. ................................ | 359/110 |

*Primary Examiner*—Leslie Pascal

[57] ABSTRACT

An optical power meter for a fiber optic link includes a photodetector that generates a current proportional to the energy of the light transmission in the fiber optic, a current-to-voltage converter that converts the current to a proportional voltage, and a voltage-to-frequency converter that converts the voltage to a digital pulse train proportional to the amplitude of the voltage. The digital pulse train increments a counter, which is read periodically by a microprocessor. The value read by the microprocessor corresponds to the average power in the light transmission. This digital value is converted to a power value in dBm and stored on a mass storage device and displayed on a liquid crystal display. The liquid crystal display shows the power level over time so that losses due to intrinsic and extrinsic loss factors can be quickly and easily identified. The power meter also includes software executed by the microprocessor that allows the user to input a range within which the power can fluctuate. If the measured power falls outside of that range, however, the power meter sets off an audible or visual warning signal to indicate a perturbation to the fiber optic link such as a mechanical stress, connector misalignment, or a security breach.

30 Claims, 9 Drawing Sheets

OPTICAL POWER METER FOR DETECTING LOSS FACTORS IN FIBER OPTIC COMMUNICATIONS

BACKGROUND OF THE INVENTION

This invention relates generally to fiber optics and more particularly to detecting and identifying perturbations to the same.

Fiber optic cable has become the predominant transmission media for telecommunications. The advantages of fiber optics are well known, most notably high bandwidth. There are, however, several disadvantages of using fiber optics over conventional communication paths. These disadvantages stem in large part from the manner in which data is communicated over the fiber optic cable. As is well known in the art, data is encoded in light pulses which are transmitted through the fiber optic cable. These lightwaves reflect within the fiber optic itself because of the difference in refractive indices of the fiber optic and the surrounding cladding. The cladding is a lossy glass that surrounds the conducting core. Because of this arrangement, the fiber optic cable is sensitive to slight perturbations to the cable, including mechanical stresses such as bending, twisting and pinching of the fiber itself. These perturbations cause the light in the fiber to be dispersed into the cable cladding, within a short distance, thereby increasing the bit error rate (BER) of the system.

Fiber optic cable is particularly sensitive to interconnect problems between adjacent fibers. These problems can be classified into two categories: intrinsic and extrinsic. The intrinsic problems include numerical aperture (NA) mismatch, which occurs when the NA of the transmitting fiber is larger than that of the receiving fiber. Another intrinsic problem, core diameter mismatch, occurs when the core or diameter of the transmitting fiber is larger than that of the receiving fiber. Cladding diameter mismatch, on the other hand, occurs when the cladding of two different fibers differ, since the core is no longer aligned. The core may also not be perfectly centered within the cladding. Ideally, the geometric axis of the core and cladding should coincide. However, this is not always the case. When they do not coincide, the fiber is said to suffer from concentricity problems. The core cladding may be elliptical rather than circular. This causes problems when two fibers are joined together because the ends do not perfectly align. All of these intrinsic problems with the fiber itself cause certain of the light to be lost or dispersed. This produces a corresponding reduction in the intensity of the light, which increases the BER of the system.

The extrinsic problems are those contributed by the connector that is used to join adjacent fibers. The four main intrinsic problems that cause loss in a fiber optic cable are lateral displacement of the connectors, end separation of the fibers, angular misalignment of the fibers, and surface roughness of the fibers. Lateral connector displacement occurs when the axis of one fiber is shifted laterally with respect to the adjacent fiber. When one fiber's axis does not coincide with that of the other, a loss occurs. This loss is approximately linear in decibels as a function of the lateral misalignment ratio L/D, where L is the displacement and D is the diameter of the fiber. When two fibers are brought together by a connector, the two opposing ends may be separated by a small gap. This gap produces two types of loss. The first is Fresnel reflection loss, which is caused by the difference in the refractive indices of the two fibers in the intervening gap, usually air. The second type of loss for multi-mode fibers results from the failure of high-order modes to cross the gap and enter the core of the second fiber. The two losses combined produce a so-called gap loss which is both a function of the end separation ratio S/D, where S is the separation gap and D is the diameter of the cable, and also of the numerical aperture (NA). The gap loss is generally linear with respect to the end separation ratio for a given NA. Further losses can occur from angular misalignment of two adjoining fibers. Ideally, the ends of the mated fibers should be perpendicular to the fiber axis and perpendicular to each other during engagement. If the fiber axis of one fiber is angularly offset with respect to the fiber axis of the adjacent fiber, a loss will occur. All of these extrinsic factors produce signal losses in the fiber.

There are several instruments that allow a user to measure the signal level in a fiber optic cable. One such instrument is the FDDI Network Interface, Model No. J2173C, designed and manufactured by Hewlett-Packard Company of Palo Alto, Calif. This FDDI Network Interface can be interposed between a light transmission source and a light transmission destination to measure the average power level received through the fiber optic cable. This interface receives the light signal transmitted through the fiber optic cable from the light transmission source, measures the average energy, and displays the measured energy on a crude bar graph consisting of a linear array of light-emitting diodes (LED).

A block diagram of the J2173C system is shown in FIG. 1. The system 10 includes an optical power meter 12 which receives the optical energy transmitted over the fiber cable, as indicated by the downward slanting arrows. The optical power meter 12 is coupled to a microcontroller system 14 via conductor 16. The optical power meter, as described further below, produces a digital pulse train whose frequency is proportional to the average optical power measured by the optical power meter 12.

The microcontroller system 14 includes a microprocessor 18 coupled to a memory 20 over bus 22. Memory 20 can include both read only memory (ROM) as well as dynamic random access memory (DRAM). Coupled to the microprocessor 18 is a mass storage device 24, which communicates to the microprocessor over bus 26 in a conventional manner. The microcontroller system 14 also includes a counter 28 that has a clock input 30 coupled to bus 16 to receive the digital pulse train from the optical power meter. The counter 28 is also coupled to the microprocessor 18, which reads the digital count out of the counter over bus 32. This count is a digital representation of the average power measured by the optical power meter.

The counter is reset or gated at predetermined time intervals by the microprocessor 18 according to the time stored in time base 34. The microprocessor 18 stores a value in time base 34 that represents the time period over which the pulses are to be counted. The microprocessor can change the value in the time base in order to change the resolution of the power measurement. The time base is coupled to a gate input 36 of the counter in order to reset the counter as well as latch the output of the counter in order to be read by the microprocessor 18. The microprocessor 18 then reads this latched value out of the counter over bus 32 by enabling the output of the counter 28 by applying an output enable signal to output enable (OE) input 38 of the counter 28.

The output of the counter 28 is a digital representation of the received optical energy measured by the optical power meter. The actual optical power is then determined by the microprocessor by either looking up the corresponding power level in a look-up table in memory 20 or calculating the corresponding power using a logarithmic equation, which is known to those skilled in the art. This optical power value is expressed in dBm and stored in the mass storage device 24. The optical power value is also displayed on display 40. The display, as mention above, consists of a plurality of LEDs arranged as a linear array to form a bar graph. The linear array corresponds to a power range of −30 dBm to −13 dBm, in 3 dBm increments. The microprocessor 18 illuminates the LEDs to provide a graphical indication of the current power level through the fiber optic cable. Although this is useful for many applications such as determining whether the FDDI specifications are being met, the resolution is insufficient to detect many of the loss factors described above. Many of these loss factors produce losses on the order of 0.1 db, which would not even be registered by the J2173C Network Interface. Moreover, even assuming the loss did produce a change in the graphical representation, this loss might be easily missed because the network interface has no way of indicating what the power level was prior to the loss. Thus, unless the technician was watching the graphical display when the loss occurred or remembered what the power level was prior to the loss, the loss may go undetected.

Referring now to FIG. 2, a schematic diagram of the optical power meter 12 is shown. The optical power meter 12 includes an energy to current converter 42 that is juxtaposed to a fiber optic cable to receive the incoming optical energy. The optical energy is received by a photodiode 44 that converts the incoming optical energy to a current I. Converter 42 also includes an amplifier 46 that forwards the received light data onto the destination coupled to terminal 48.

The current I produced by the photodiode 44 is coupled to a current-to-frequency converter 50. The current-to-frequency converter 50 includes a standard current-to-frequency converter 52 manufactured by Analog Devices and sold under the Part No. AD654JR. The voltage-to-frequency converter 52 is biased in a conventional manner as described in the data sheets accompanying the AD654JR and is therefore not described further. The current-to-frequency converter 60 produces a digital pulse train FREQ—OUT whose frequency is proportional to the amplitude of the current generated by the photodiode 44, which in turn, is proportional to the average power of the received light transmission. This relationship holds because of the unique coding scheme used in fiber optic communication. As is known in the art, the lowest level coding uses an equal number of ones and zeros over a predetermined number of bits. Accordingly, the frequency of the digital pulse train FREQ—OUT corresponds to the average power level in the received light transmission.

Hewlett-Packard also makes another communication instrument with an integrated power meter Model No. 156MTS that overcomes one of the limitations of the HP J2173C. The HP 156MTS displays a numerical value corresponding to the average power level in the fiber optic cable. The numerical value has one digit to the right of the decimal point so presumably the power meter can resolve losses of ±0.1 dB. Thus, the HP 156MTS should be able to resolve relatively small losses due to the above-described factors. The problem, however, is that this product does not include the ability to notify the technician of any such losses. As with the HP J2173C, a loss would likely go undetected unless the technician was observing the numerical display when the loss occurred or happened to remember what the numerical value was prior to the loss. Moreover, the 156MTS is not designed to stay in the signal path of an active fiber link. Instead, it is a test set designed solely for setting up and initially testing the link, not for full time monitoring. In either case, these products do not provide a reliable way to identify problems in the cable.

Accordingly, a need remains for a method of informing a technician or other concerned personnel of a problem in the fiber optic cable.

SUMMARY OF THE INVENTION

It is, therefore, an object of the invention to reliably and accurately inform the user of loss factors in the fiber optic cable due to intrinsic and extrinsic factors.

In order to accomplish this objective, the applicant has invented an optical power meter that includes a graphical display for displaying historical power levels of the power in the fiber optic link. The power meter can resolve very small losses in order to detect both intrinsic and extrinsic loss factors in the fiber optic link. The optical power meter, in the preferred embodiment, includes an optical energy to current converter that receives the optical energy transmitted through the fiber and converts it to a current proportional to the average power in the light transmission. This converter also amplifies the received light and forwards it onto its destination so as to not interrupt the transmission. This allows the optical power meter to be placed continuously in the system so as to record historical power level data. Power meter also includes a current-to-voltage converter, which in the preferred embodiment, is a transimpedance amplifier. The transimpedance amplifier converts the current to a negative voltage proportional to the amplitude of the current. The output of the transimpedance amplifier is coupled to a voltage-to-frequency converter that converts the voltage output of the transimpedance amplifier to a pulse train having a frequency proportional to the amplitude of the voltage signal. This pulse train increments a counter that is read in periodic intervals by a microprocessor. The microprocessor reads the digital output of the counter and resets the counter to begin counting the number of pulses in the next time period. This digital value provided by the counter then is a digital representation of the optical power level. The microprocessor can either then look up the power level corresponding to this digital representation in a look-up table or calculate the average power level on the fly using a logarithmic equation.

The power meter is part of a protocol analyzer system, which is preferably portable, that includes an LCD display and a mass storage device. The microprocessor displays the power level on a graph whose vertical axis is the measured power level in dBm and whose horizontal axis is time. The microprocessor also stores the power data on the mass storage device so that it later can be retrieved and analyzed. This system also allows the user to change the time scale of the horizontal axis so that either long periods of time can be displayed to identify problems that may have occurred over a long period of time or a short time frame to analyze individual losses to determine the cause thereof.

In another aspect of the invention, the system allows the user to set limits within which the power level should operate. If the measured power level falls outside of this user-defined range, the system will generate a warning signal either visually or audibly. This limit can be either above or below, or both, a baseline power level that is measured by the power meter.

The foregoing and other objects, features and advantages of the invention will become more readily apparent from the following detailed description of a preferred embodiment of the invention which proceeds with reference to the accompanying drawings.

DETAILED DESCRIPTION

Figure 3:
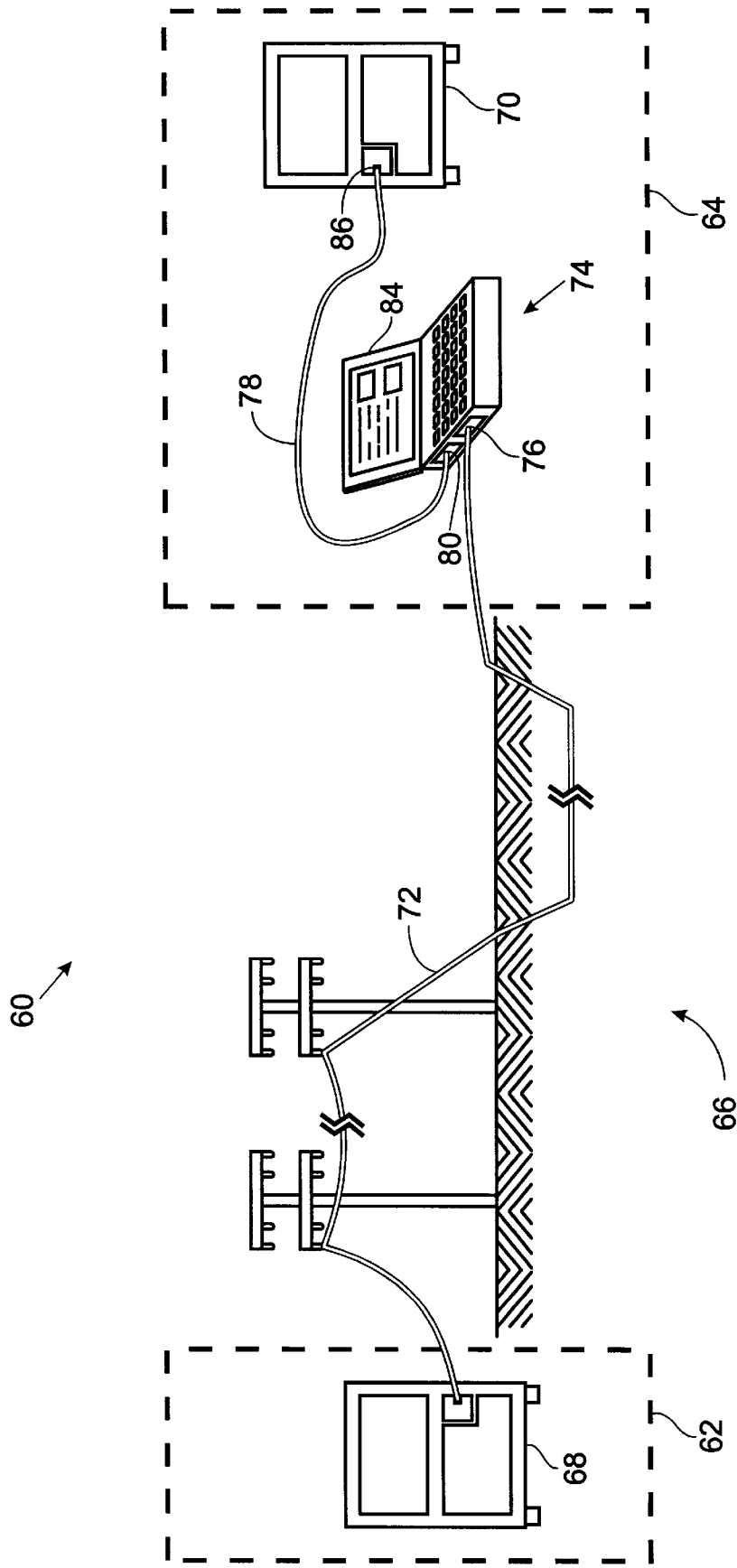
FIG. 3 is a block diagram of a fiber optic transmission system including the optical power meter according to the invention.

Referring now to FIG. 3, a fiber optic communication system according to the invention is shown generally at 60. The system includes a light transmission source 62, a light transmission destination 64, and a fiber optic link shown generally at 66. The source 62 includes a computer 68 located in a secured environment, as indicated by the dashed lines, although it is not required to be so secured by the invention. The destination similarly includes a computer 70 also preferably located in a secured environment. The secured environment is shown because one application of the power meter according to the invention is to detect security breaches to the fiber. The invention is not limited, however, to secured environments, but instead can be used in unsecured environments. Coupled between the source and destinations is a fiber optic link 66 that is both above ground and below ground, as is known in the art. The particulars of the fiber optic link are not important to the invention. Instead, the power meter according to the invention can be used with any fiber optic cable either now known or developed in the future. The fiber optic link will be referred to herein as cable 72, although it is understood that the cable may include a multiplicity of individual segments as well as having repeaters (not shown) located therein.

Figure 1:
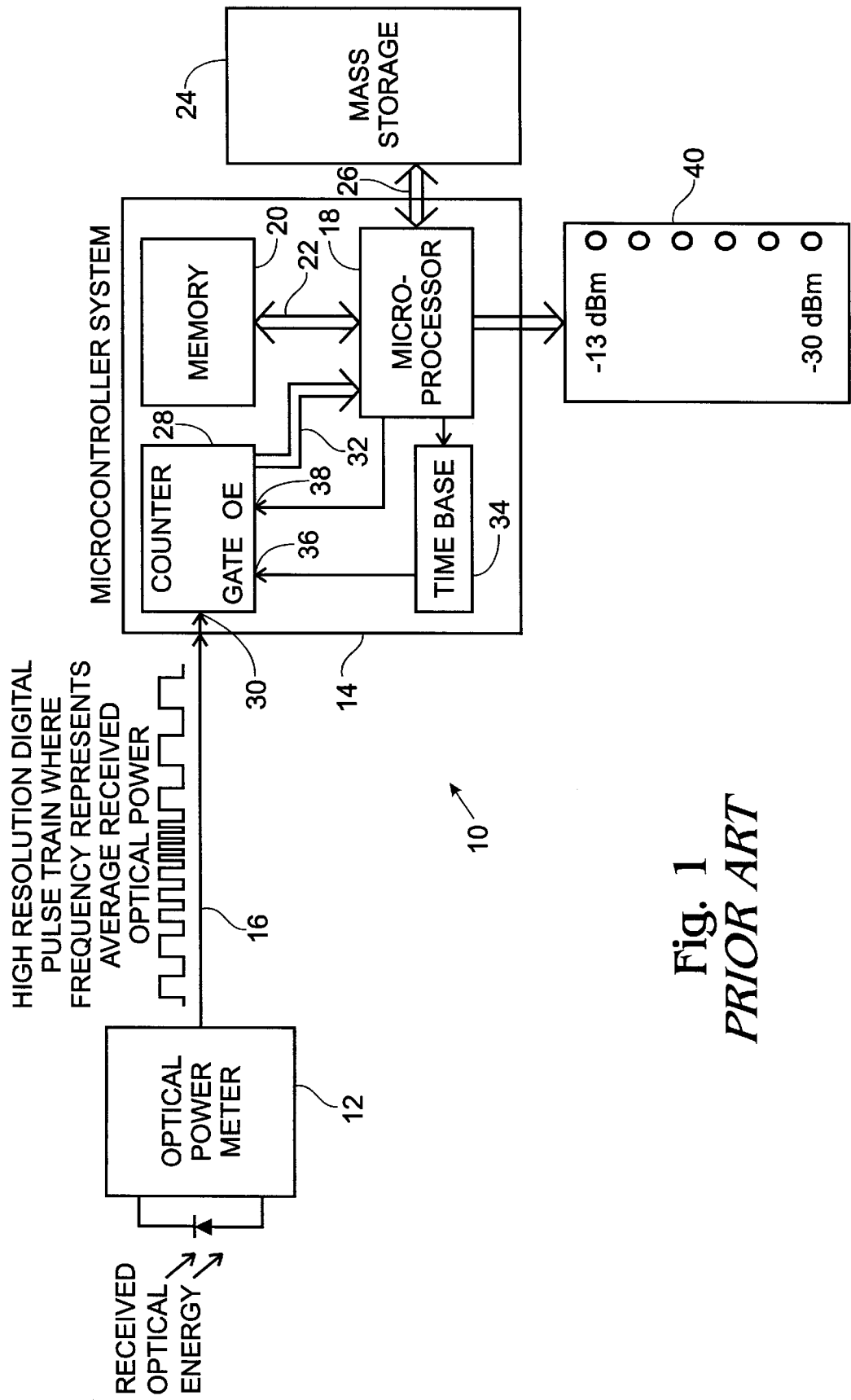
FIG. 1 is a block diagram of a prior art optical power meter and associated digital electronics.
Figure 2:
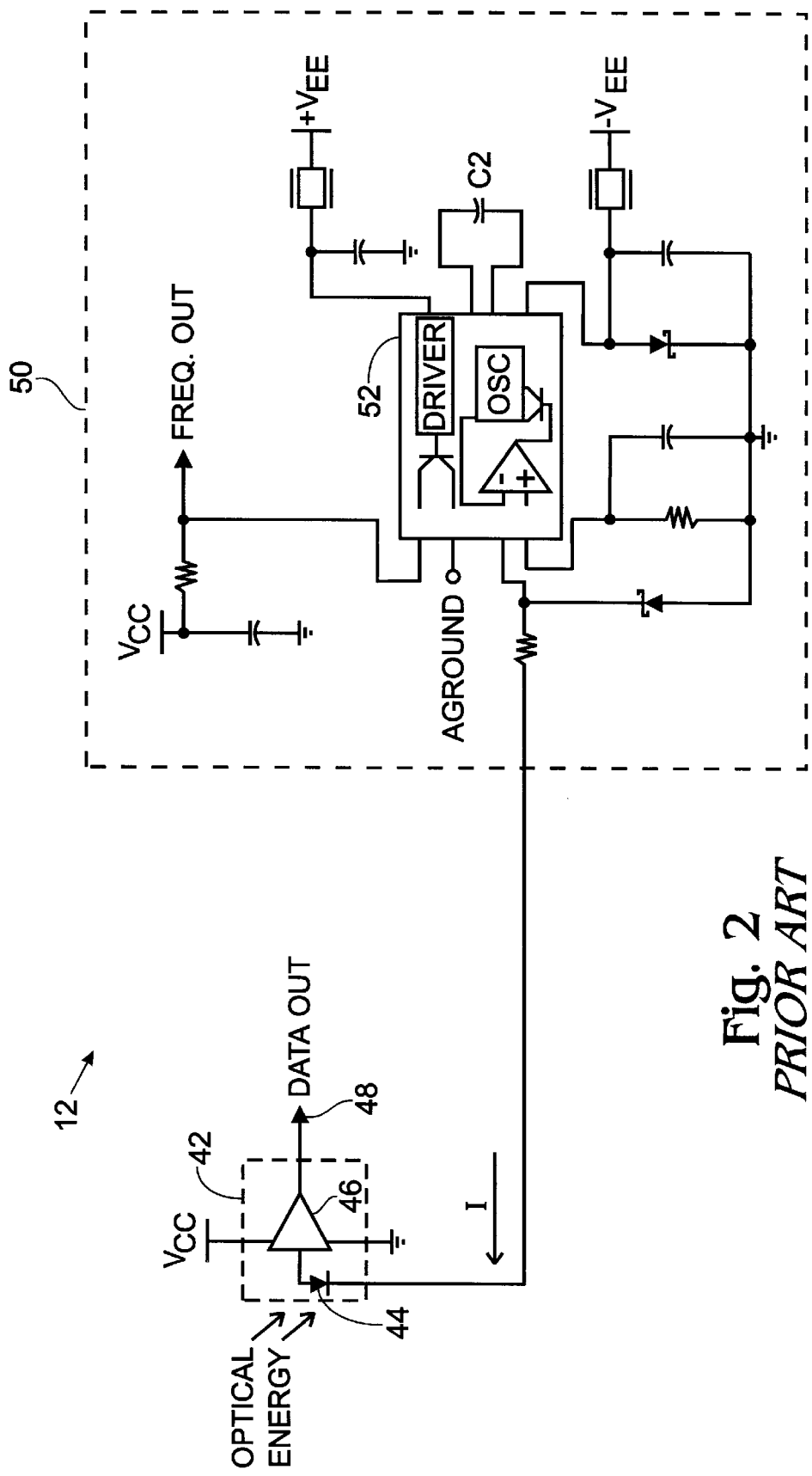
FIG. 2 is a schematic diagram of the optical power meter of FIG. 1.

Interposed between the source 62 and destination 64 is the optical power meter system 74 according to the invention. The system 74 includes an input jack 76 coupled to cable 72 that receives the light transmission conducted over cable 72. An additional fiber optic cable 78 is coupled between an output jack 80 of the system and an input jack 86 of computer 70. The system, as mentioned above, measures the optical power and the light transmission while at the same time passing the data through to the destination. As shown in FIG. 1, the system 74 is preferably based on a portable personal computer. As with such computers, the system 74 includes a keyboard as well as a mouse input device (not shown) and a display 84. The display 84, in the preferred embodiment, is a liquid crystal display (LCD), but the invention is not limited thereto. The portable computer allows the optical power meter system to be easily transported and used in different environments. Alternatively, a desktop computer could be used or a stand-alone optical power meter system including the components hereinafter described.

Figure 4:
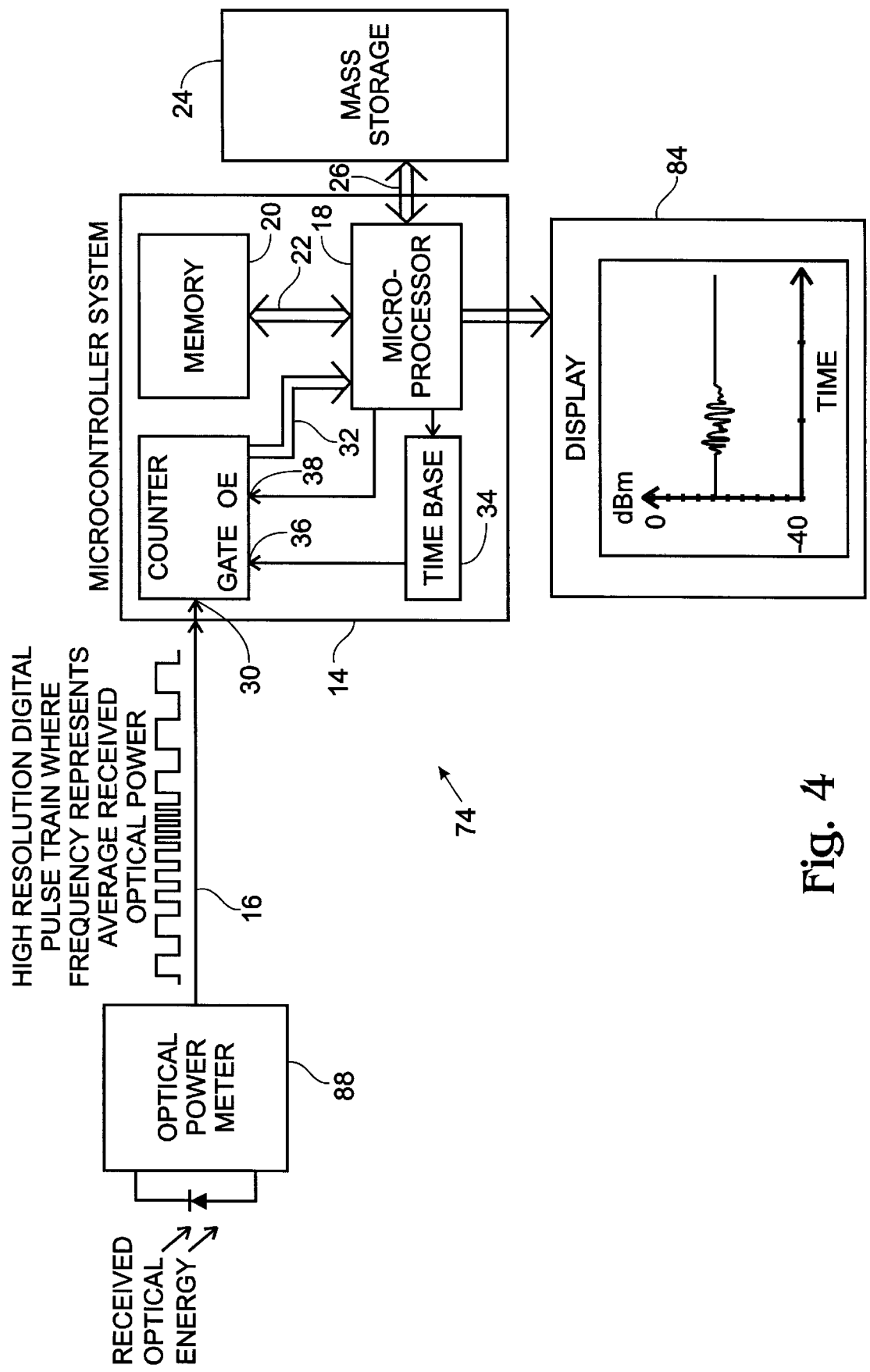
FIG. 4 is a block diagram of the electronics of the optical power meter and associated digital electronics shown in FIG. 3.

Referring now to FIG. 4, a block diagram of the system 74 is shown. The system is similar to that shown in FIG. 1, with several notable exceptions. Common elements between FIGS. 1 and 4 retain common reference numerals. The description above applies to those common elements and is therefore not repeated.

The first difference is a different optical power meter 88 is used. This power meter 88 is described further below with reference to FIGS. 5 and 6. Another difference is that the system 74 includes an LCD display 84 and associated software to display historical power data, as discussed further below. Part of this software allows the microprocessor to change the value in the time base in order to change the bandwidth or sample time of the power measurement. In the preferred embodiment, the value is within the range of 0.01 to 1.0 seconds, but is not limited thereto. The system software also allows the user to specify the timeframe over which the measured power levels are displayed. This allows the user to view the power level over a long period of time to identify changes in the power level during that time or to focus in on short time intervals to analyze individual events to identify the root cause thereof.

Figure 5:
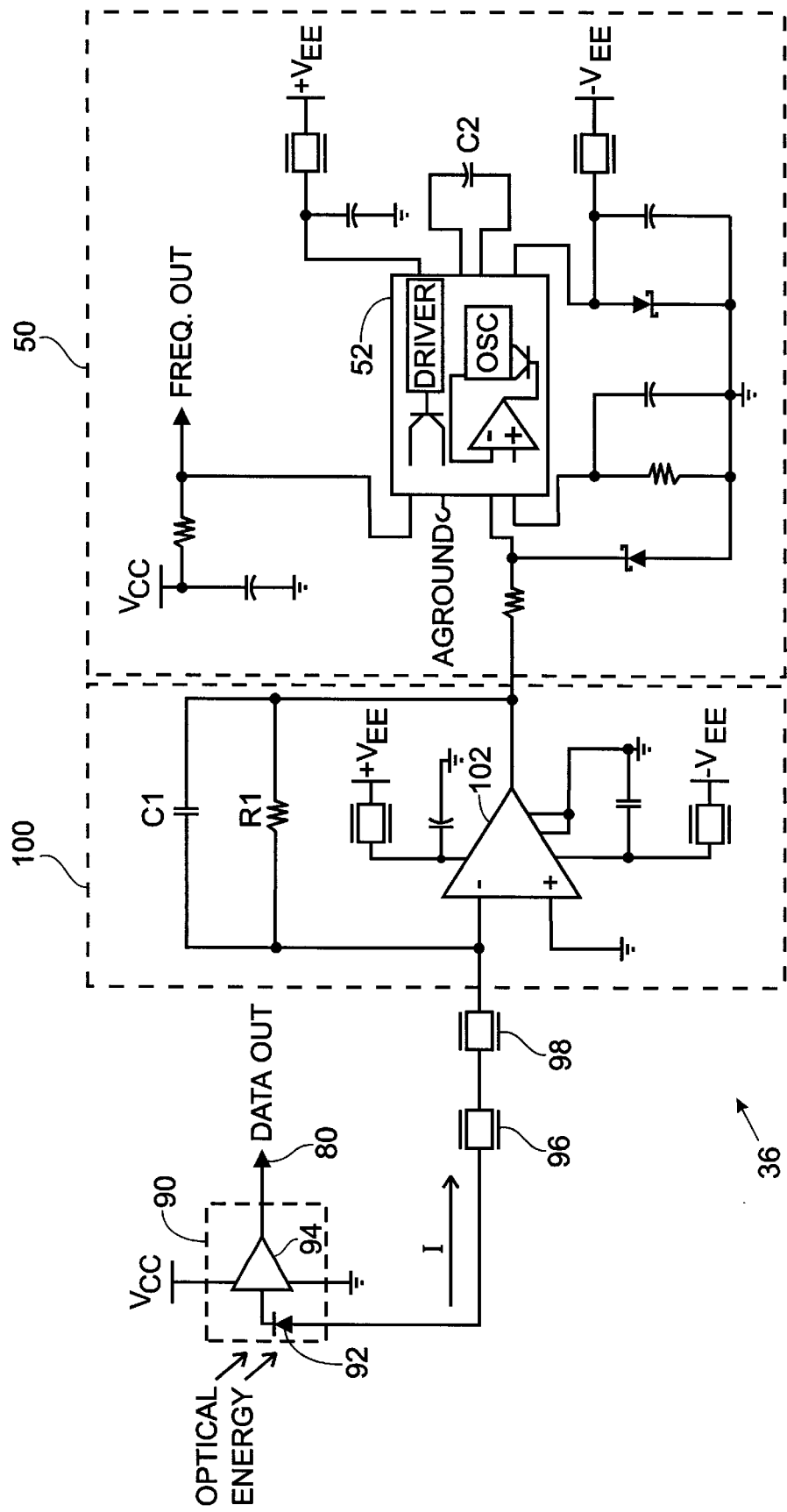
FIG. 5 is a schematic diagram of a first embodiment of the optical power meter of FIG. 4.

Referring now to FIG. 5, a schematic diagram of a first embodiment of the optical power meter 85 is shown. The optical power meter 88 according to the invention includes an energy to current converter 90 that is juxtaposed to the cable 72 to receive the incoming optical energy. The optical energy is received by a photodiode 92 that converts the incoming optical energy to a current I. The photodiode 92, in the preferred embodiment, is an indium gallium arsenide photodiode having a wavelength of 1310 nanometers (nm). Converter 90 also includes an amplifier 94 that forwards the received light data onto the destination.

The current I produced by the photodiode 92 is passed through a high frequency filter comprised of multi-layered ferrites 96 and 98. The output of the high frequency filter is a DC current. The output of the filter is provided to a current-to-voltage converter 100. At the core of current-to-voltage converter is a transimpedance amplifier 102. The amplifier 102 has a noninverting input connected to ground and an inverting input connected to the output of the high frequency filter. By grounding the noninverting input, a zero bias voltage is provided to the anode of the photodiode 92. The transimpedance amplifier 102 includes a parallel capacitor C1 and resistor RI combination in the feedback loop to create a low frequency pole (e.g., 159 Hz). The lowpass filter in the feedback path is optional, however, because of the bandwidth of the transimpedance amplifier, which cannot respond to the high frequency components in any case. The transimpedance amplifier produces a negative voltage that is proportional to the amplitude of the photo current I.

The output of the transimpedance amplifier 102 is coupled to a negative voltage-to-frequency converter 70. The converter 70 includes a standard voltage-to-frequency converter 78 manufactured by Analog Devices and sold under the Part No. AD654JR. The voltage-to-frequency converter 70 is connected in a conventional manner as described in the data sheets accompanying the AD654JR and is therefore not described further. One notable point, however, is that highly precise components are used such as 0.1% resistors to achieve the desired level of resolution. In addition, a polystyrene capacitor C2 is used instead of conventional tantalum capacitors. The negative voltage-to-frequency converter 70 produces a digital pulse train FREQ_OUT whose frequency is proportional to the amplitude of the negative voltage generated by the current-to-voltage converter 100, which in turn is proportional to the average power of the received light transmission. This relationship holds because of the unique coding scheme used in fiber optic communication. As is known in the art, the lowest level coding uses an equal number of ones and zeros over a predetermined number of bits. Accordingly, the frequency of the digital pulse train FREQ_OUT precisely corresponds to the average power level in the received light transmission.

Figure 6:
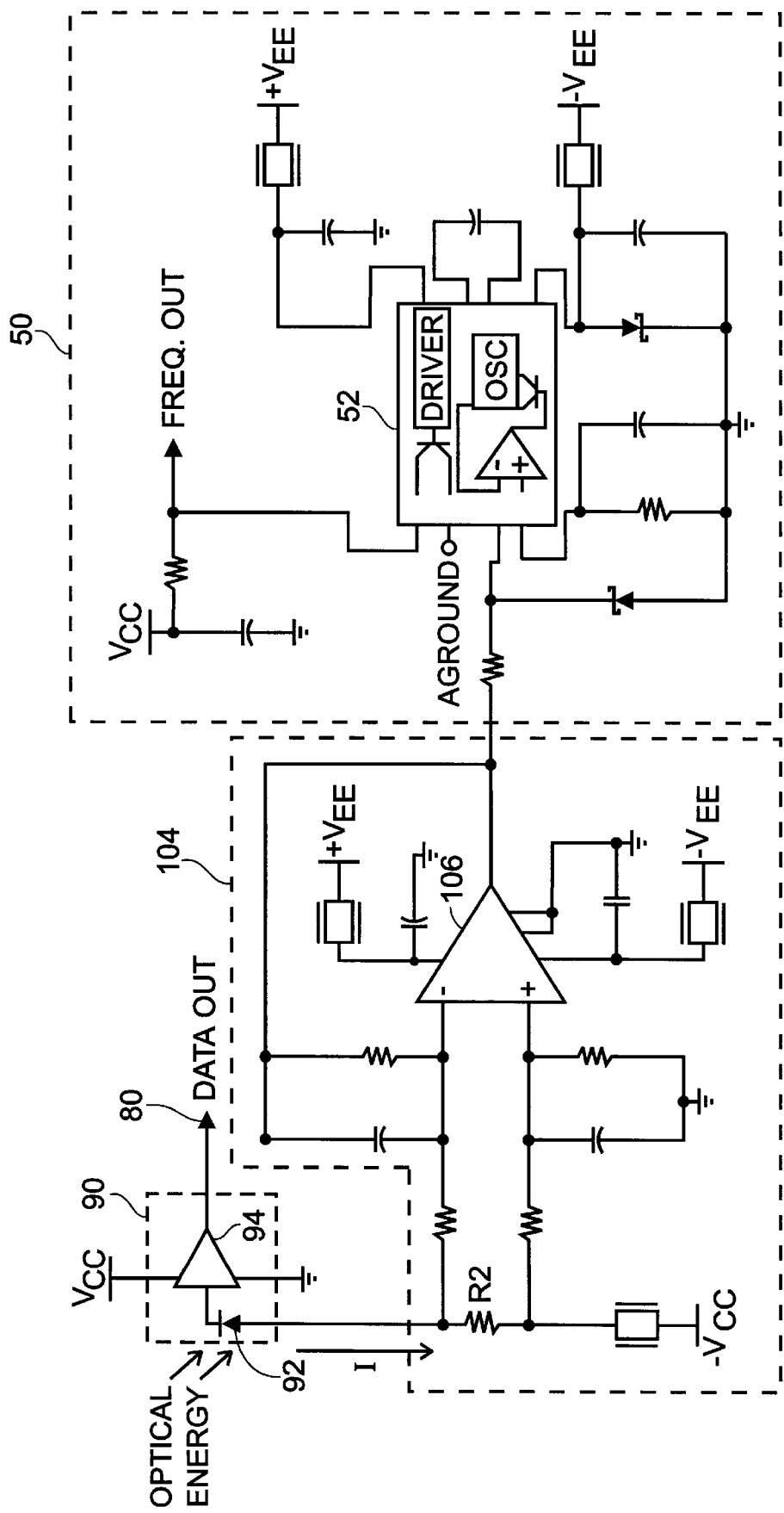
FIG. 6 is a schematic diagram of a second embodiment of the optical power meter of FIG. 4.

Another version of the optical power meter 88 is shown in FIG. 6. This embodiment is used where a negative bias is required for the photodiode. In this case, the current-to-voltage converter employs a differential buffer 106 having a resistor R2 coupled across its inverting and noninverting terminals to sense the current produced by the photodiode 92. The current is passed through resistor R2 thereby generating a voltage thereacross, which is detected by the differential buffer 82 and amplified to its output. The converters 70 is identical to that used in the first embodiment and is therefore not discussed further.

Figure 7:
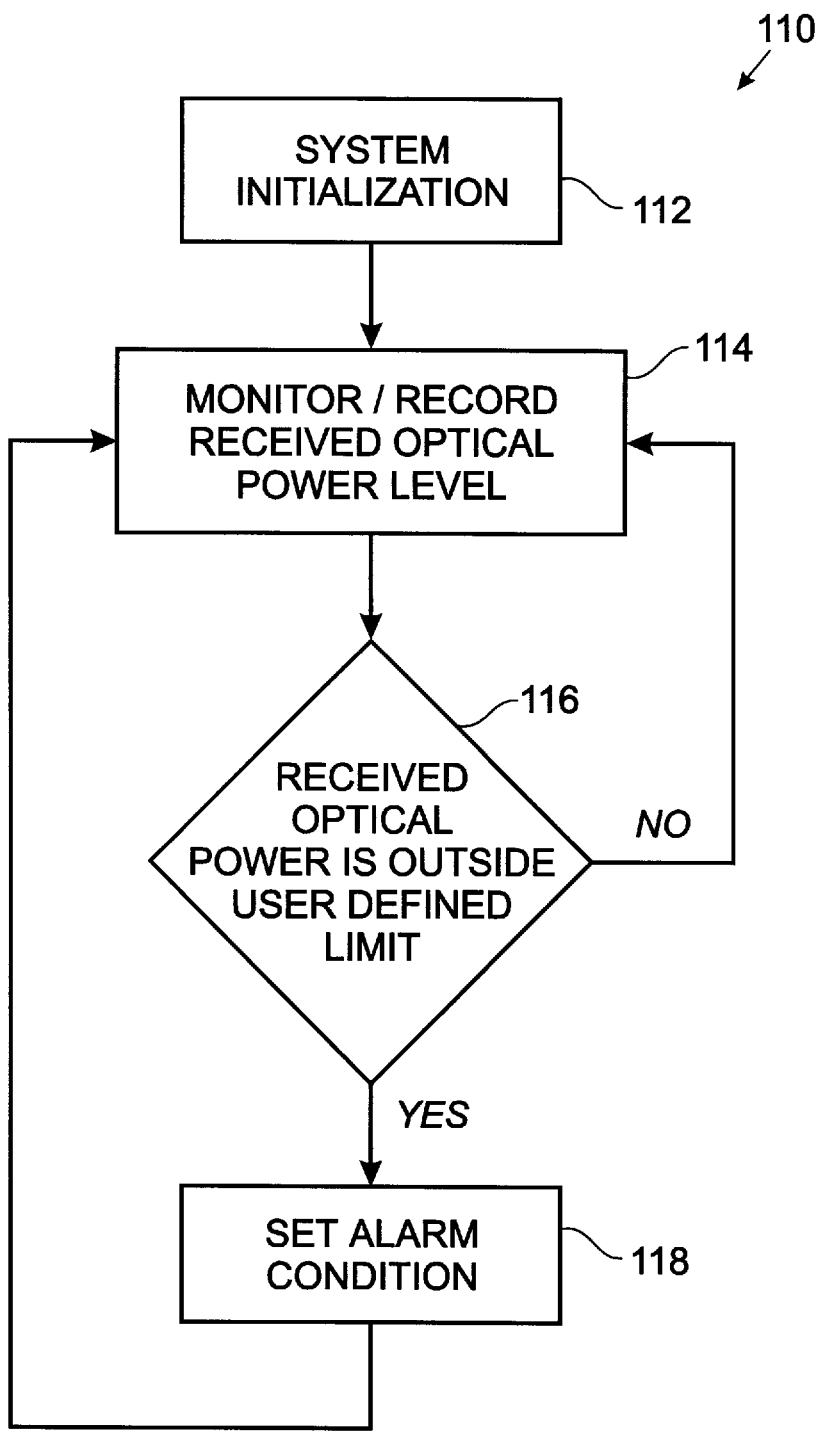
FIG. 7 is a flow chart of the warning system software executed by the microprocessor of FIG. 4.

Referring now to FIG. 7, a flow chart of the system software is shown. The software is executed by the microprocessor 18 shown in FIG. 5 and stored in the memory 20 and/or the mass storage unit 24. In addition to displaying the optical power level as it is measured, the system also monitors the level to detect slight variations that could be caused by internal and/or external loss factors. This operation is shown in FIG. 7.

The system begins by initializing itself in step 112. As part of this step, the system gathers a baseline of information against which subsequent measurements can be compared. It is assumed that this baseline level corresponds to a unperturbed state of the fiber optic link. Accordingly, the initialization should be done as soon after the installation of the link as possible so that there are no intervening perturbations to the link. The system can also prompt the user during the initialization step to enter an upper and/or lower bound within which the user wants the power level to remain. If the measured power level falls outside of one of these bounds, the system will set an alarm condition or generate a warning, as described further below.

After the initialization is complete, the system monitors and records the received optical power level in step 114. In this step, as described above, the microprocessor 18 reads the counter value and looks up or computes the corresponding power level. Once the power level is known, the value is stored to the mass storage device 24 and displayed on the LCD display 84 according to user-defined display parameters.

The system then compares the received optical power level determined in step 114 to the user-defined limits set in the initialization step 112. If the power level is within these user-defined limits, the microprocessor 18 transitions back to step 114 and the next sample is taken after the predetermined time period has elapsed. If, on the other hand, the received optical power falls outside one of the user-defined limits, the system sets an alarm condition in step 118 to notify the technician or user of the loss. This alarm condition can either be audible or visual. The alarm condition therefore notifies the user that the fiber optic link has been perturbed in some manner. The user can then examine the display to determine what may have been the root cause of the loss and therefore identify and isolate the problem. Thus, the system is a powerful tool to monitor and troubleshoot fiber optic networks.

Figure 8:
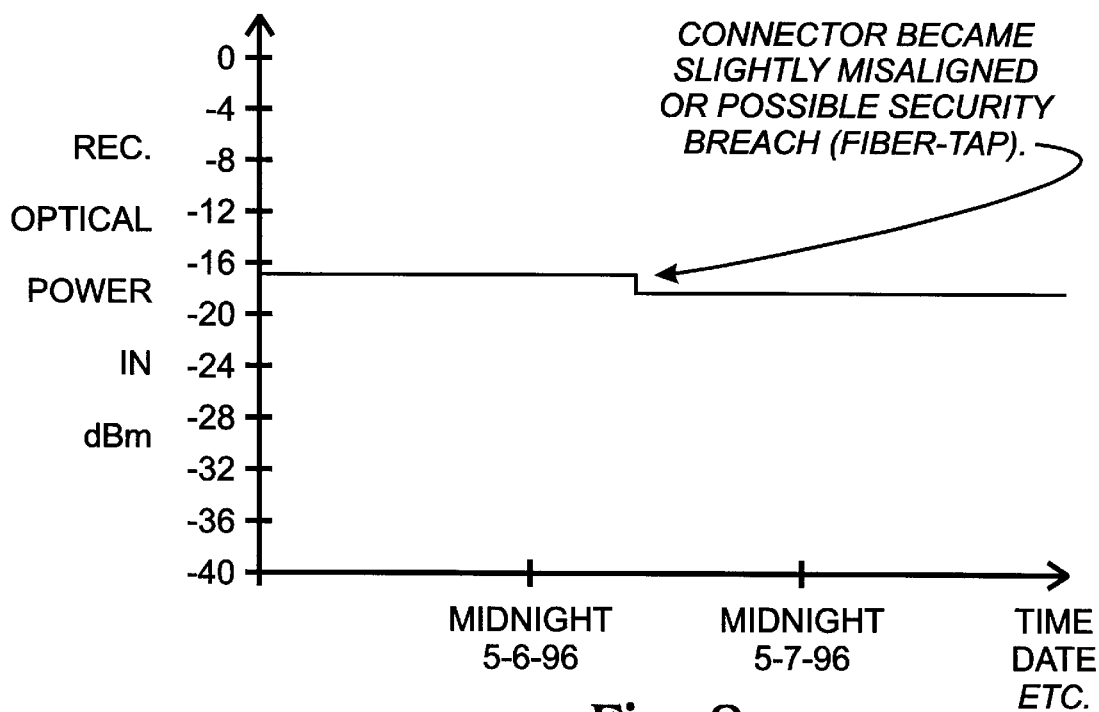
FIG. 8 is a graphical display produced by the optical power meter according to the invention showing the change in measured power due to a connector misalignment or a fiber tap.

Several exemplary displays are shown in FIGS. 8–11. These displays show the resulting displays produced by the system shown in FIG. 4 under various conditions. In FIG. 8, the displayed power level shows a downward step. This step could be caused by a connector becoming misaligned or possibly due to a security breach, i.e., a fiber tap on the optical fiber itself This information could prompt the user to perform an inspection of the fiber link in order to identify the misaligned connector or possibly even the fiber tap.

Figure 9:
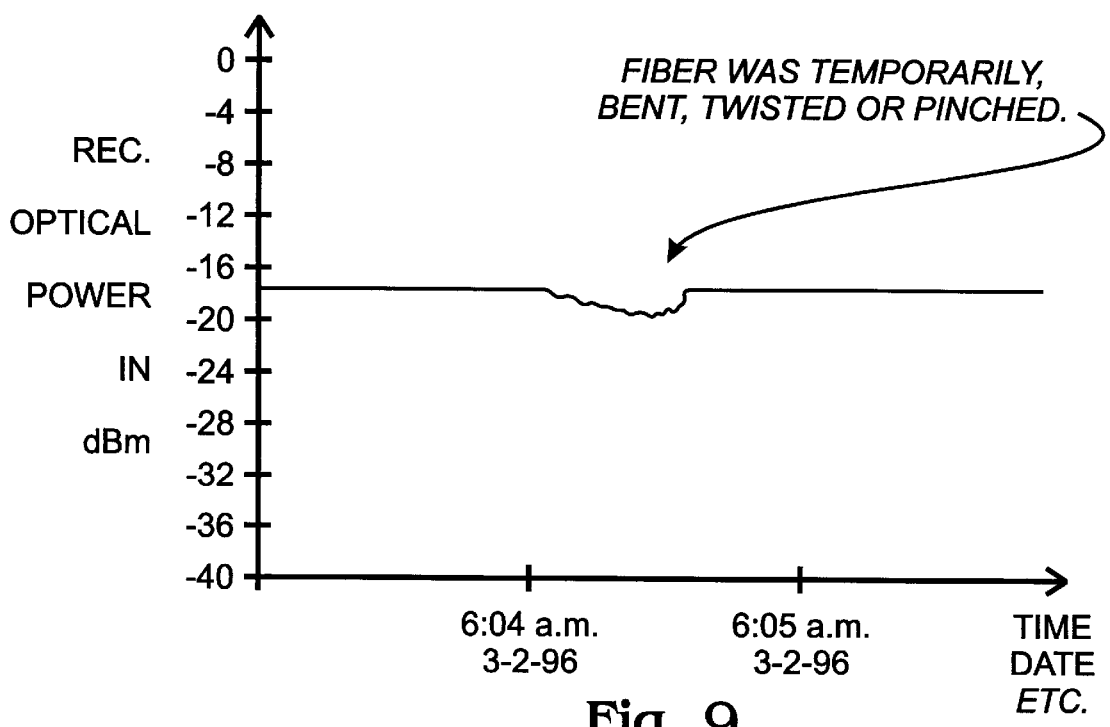
FIG. 9 is a graphical display produced by the optical power meter according to the invention showing the change in measured power due to the fiber being temporarily bent, twisted or pinched.

In FIG. 9, the horizontal axis shows a much shorter timeframe than that in FIG. 8. The system allows the user to specify the time scale by inputting the desired time scale using the keyboard or mouse, or alternatively, selecting between predefined time scales. The power loss shown in FIG. 9 may be caused by a fiber being temporarily bent, twisted or pinched. Although the display shows a loss during a short time period, the power level rises back to substantially the same power level as before the perturbation. Thus, the system informs the user that the condition no longer exists that caused the loss. Nonetheless, the user may still want to know that such a perturbation existed because it may suggest an ongoing problem or may result in a weakening of the fiber link that could eventually cause a failure of the system.

Figure 10:
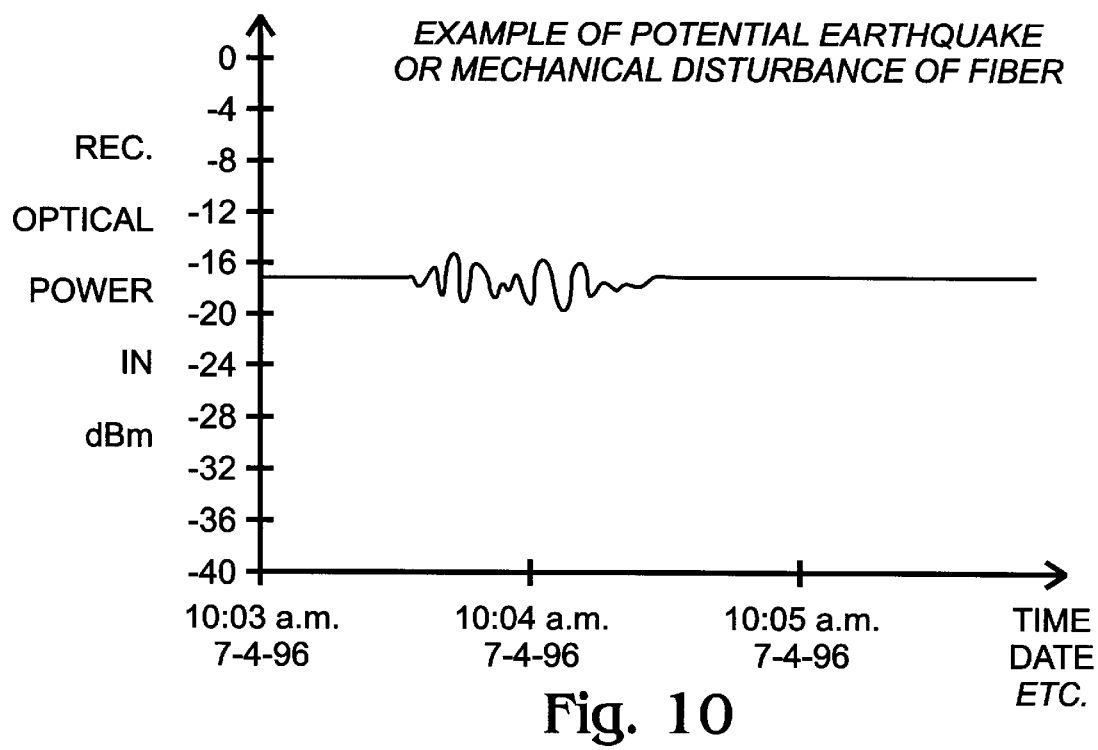
FIG. 10 is a graphical display produced by the optical power meter system according to the invention showing the change in measured power due to a mechanical disturbance of the fiber.
Figure 11:
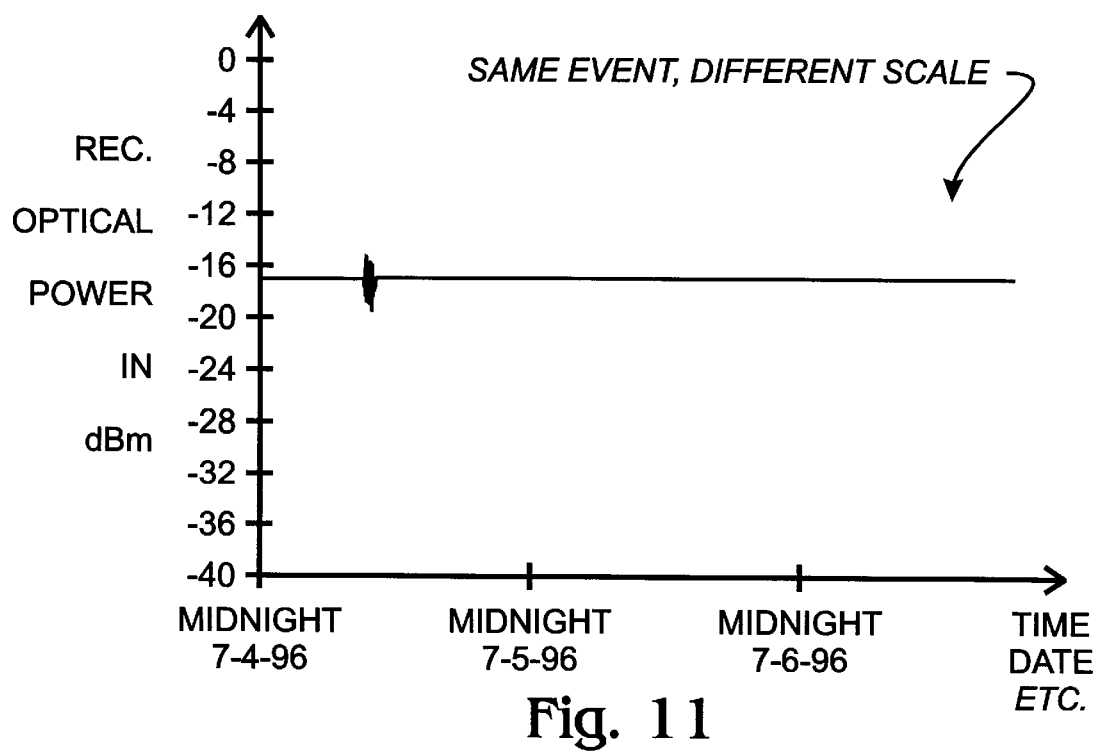
FIG. 11 is the graphical display shown in FIG. 10 with a longer time scale.

Another scenario is shown in FIGS. 10 and 11 using two different time scales. FIG. 10 shows the display generated by a mechanical disturbance of the fiber such as caused by an earthquake. The display in FIG. 10 uses a short time scale, which allows a user to examine the particulars of the power level during the disturbance. This level of resolution may allow the user to identify where, how and certainly when, the disturbance occurred. The same event is shown in a longer time scale in FIG. 11. This scale is useful where the user may be gone for several days and wants to display the entire length of his absence to identify any losses that may have occurred during that time. The user could then focus in on the event by changing the time scale to produce the display shown in FIG. 10. From this, the user could better ascertain the cause and potentially identify the source of the problem.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. A method of detecting perturbations in a fiber optic cable, the method comprising the steps of:

transmitting light through a fiber optic cable from a first location to a second location;

continuously measuring an average baseline power level of the light transmission in the fiber optic cable in an unperturbed state;

measuring an average power level of the light transmission in the fiber optic cable;

comparing the measured average power level to the average baseline power level;

generating a warning if the measured average power level is outside the baseline power level; and displaying the measured average threshold power level and the average power level over time.

2. The method of detecting perturbations in a fiber optic cable according to claim 1 wherein the step of measuring an average power level of the light transmission in the fiber optic cable includes converting the light to a digital representation, the digital representation being proportional to the average power level of the light transmission.

3. The method of detecting perturbations in a fiber optic cable according to claim 1 wherein the step of measuring a power level of a light transmission in the fiber optic cable includes measuring the absolute level of light transmission.

4. The method of detecting perturbations in a fiber optic cable according to claim 1 wherein the displayed average power level defines a waveform having a shape, the method further including categorizing the perturbation based on the waveform shape.

5. A method of detecting perturbations in a fiber optic cable, the method comprising the steps of:

transmitting light through a fiber optic cable from a first location to a second location;

measuring an average power level of the light transmission in the fiber optic cable including converting the light to a digital representation, the digital representation being proportional to the average power level of the light transmission;

comparing the measured average power level to a threshold power level;

generating a warning if the measured average power level is outside the threshold power level; and displaying the measured average power level over time;

wherein the step of converting the light to a digital representation includes:
converting the light to a current;
converting the current to a voltage;
converting the voltage to a pulse train, wherein the pulse train has a frequency proportional to the average power of the light; and
converting the pulse train to a digital value proportional to the average power of the light transmission.

6. The method of detecting perturbations in a fiber optic cable according to claim 3 wherein the step of measuring an average power level of a light transmission in the fiber optic cable includes interposing an optical power meter between a light transmission source and a light transmission destination without substantially interrupting the light transmission from the source to the destination.

7. The method of detecting perturbations in a fiber optic cable according to claim 5 wherein the step of comparing the measured average power level includes comparing the measured average power level to an average power level of the fiber optic cable in an unperturbed state.

8. The method of detecting perturbations in a fiber optic cable according to claim 5 including the step of measuring an average power level of the fiber optic cable in an unperturbed state.

9. The method of detecting perturbations in a fiber optic cable according to claim 5 including the steps of:

prompting a user to enter a user defined threshold; and comparing the measured power level to the user defined threshold.

10. The method of detecting perturbations in a fiber optic cable according to claim 5 including the step of identifying a security breach in the cable in response to the warning.

11. The method of detecting perturbations in a fiber optic cable according to claim 5 including the step of identifying a physical disturbance in the cable in response to the warning.

12. A method of detecting perturbations in a fiber optic cable, the method comprising the steps of:

transmitting light through a fiber optic cable from a first location to a second location;

measuring an average power level of the light transmission in the fiber optic cable including converting the light to a digital representation, the digital representation being proportional to the average power level of the light transmission;

comparing the measured average power level to a threshold power level;

generating a warning if the measured average power level is outside the threshold power level; and displaying the measured average power level over time;

wherein the step of converting the light to a digital representation includes:
converting the light to a current;
converting the current to a voltage; and
converting the voltage to a digital value proportional to the average power of the light transmission.

13. The method of detecting perturbations in a fiber optic cable according to claim 12 wherein the step of measuring an average power level of a light transmission in the fiber optic cable includes interposing an optical power meter between a light transmission source and a light transmission destination without substantially interrupting the light transmission from the source to the destination.

14. The method of detecting perturbations in a fiber optic cable according to claim 12 wherein the step of comparing the measured average power level includes comparing the measured average power level to an average power level of the fiber optic cable in an unperturbed state.

15. The method of detecting perturbations in a fiber optic cable according to claim 12 including the step of measuring an average power level of the fiber optic cable in an unperturbed state.

16. The method of detecting perturbations in a fiber optic cable according to claim 12 including the steps of:

prompting a user to enter a user defined threshold; and comparing the measured power level to the user defined threshold.

17. The method of detecting perturbations in a fiber optic cable according to claim 12 including the step of identifying a security breach in the cable in response to the warning.

18. The method of detecting perturbations in a fiber optic cable according to claim 12 including the step of identifying a physical disturbance in the cable in response to the warning.

19. A fiber optic communication system comprising:

a light transmission source;

a light transmission destination;

a fiber optic cable coupled between the light transmission source and the light transmission destination for transmitting light therebetween;

a warning system coupled to the fiber optic cable for continuously measuring an average baseline power level in the fiber optic cable in an unperturbed state and for identifying perturbations in the fiber optic cable by measuring the average power level of the perturbation and comparing the average power level of the perturbation with the average baseline power level, the perturbations being identified without substantially interrupting the light transmission from the light transmission source to the light transmission destination; and a display coupled to the warning system for displaying average power level over time of the perturbations identified in the fiber optic cable.

20. The fiber optic communication system according to claim 19 wherein the warning system includes:

an optical power meter coupled to the fiber optic cable for measuring the average optical power of the light in the fiber optic cable; and a warning circuit coupled to the optical power meter for generating a warning signal when the measured average optical power falls outside a threshold.

21. The fiber optic communication system according to claim 20 wherein the light transmission source includes a computer system in a secure environment.

22. The fiber optic communication system according to claim 21 wherein the light transmission destination includes a computer system in a secure environment.

23. An optical power meter for measuring average power of a light transmission from a light source to a light destination in a fiber optic cable, the optical power meter comprising:

an energy to current converter coupled to the fiber optic cable when in operation, the energy to current converter receiving the light transmission and generating a current proportional to the average energy of the light transmission, the energy to current converter including a photodiode coupled to the fiber optic cable, the photodiode having an anode and a cathode;

a current to voltage converter coupled to the photodiode anode for receiving the current and generating a voltage proportional thereto, the current to voltage converter including a transimpedance amplifier for generating a voltage proportional to the current, the transimpedance amplifier including an inverting input coupled to the energy to current converter, a non-inverting input coupled to ground to provide a zero volt bias to the energy to current converter, and an output for providing the voltage proportional to the current;

a low pass filter coupled to the energy to current converter and the current to voltage converter for filtering out high frequency components above a predetermined corner frequency;

a voltage to frequency converter coupled to the current to voltage converter for converting the voltage to a pulse train having a frequency proportional to the amplitude of the voltage;

a counter having a clock input coupled to the voltage to frequency converter and an output for providing a digital representation; and means coupled to the counter for converting the digital representation to a calibrated average power value.

24. The optical power meter according to claim 23 wherein the energy to current converter includes an amplifier coupled to the photodiode cathode.

25. The optical power meter according to claim 23 wherein the means coupled to the counter for converting the digital representation to an average power value includes:

a microprocessor operatively coupled to the counter to read the digital representation at predetermined intervals; and a memory having a look-up table stored therein, the look-up table having a corresponding average power entry for each digital representation.

26. The optical power meter according to claim 23 wherein the means coupled to the counter for converting the digital representation to an average power value includes:

a microprocessor operatively coupled to the counter to read the digital representation at predetermined intervals; and a memory operatively coupled to the microprocessor for providing instructions thereto, the microprocessor computing an average power entry in response to the digital representation.

27. The optical power meter of claim 23 wherein the voltage to frequency converter includes 0.1% tolerance resistors and a polystyrene capacitor.

28. An optical power meter for measuring average power of a light transmission from a light source to a light destination in a fiber optic cable, the optical power meter comprising:

an energy to current converter coupled to the fiber optic cable when in operation, the energy to current converter receiving the light transmission and generating a current proportional to the average energy of the light transmission without substantially interrupting the light transmission from the source to the destination, the energy to current converter including a photodiode coupled to the fiber optic cable, the photodiode having an anode and a cathode;

a differential amplifier coupled to the energy to current converter for receiving the current and generating a voltage proportional thereto, the differential amplifier including an inverting input coupled to a first end of a resistor, a non-inverting input coupled to a second end of the resistor, and an output for providing a voltage proportional to the photodiode current flowing through the resistor;

a low pass filter coupled to the differential amplifier for filtering out high frequency components above a predetermined corner frequency;

a voltage to frequency converter coupled to the current to voltage converter for converting the voltage to a pulse train having a frequency proportional to the amplitude of the voltage;

a counter having a clock input coupled to the voltage to frequency converter and an output for providing a digital representation; and means coupled to the counter for converting the digital representation to a calibrated average power value.

29. The optical power meter according to claim 28 wherein the low pass filter is a ferrite.

30. The optical power meter according to claim 28 wherein the voltage to frequency converter includes 0.1% tolerance resistors and a polystyrene capacitor.

* * * * *